United States Patent
Knoth et al.

(10) Patent No.: US 7,650,465 B2
(45) Date of Patent: *Jan. 19, 2010

(54) MICRO TAG ARRAY HAVING WAY SELECTION BITS FOR REDUCING DATA CACHE ACCESS POWER

(75) Inventors: Matthias Knoth, San Jose, CA (US); Ryan C. Kinter, Sammamish, WA (US)

(73) Assignee: MIPS Technologies, Inc., Sunnyvale, CA (US)

(*) Notice: Subject to any disclaimer, the term of this patent is extended or adjusted under 35 U.S.C. 154(b) by 162 days.

This patent is subject to a terminal disclaimer.

(21) Appl. No.: 11/505,865

(22) Filed: Aug. 18, 2006

(65) Prior Publication Data

US 2008/0046652 A1    Feb. 21, 2008

(51) Int. Cl.
*G06F 12/00* (2006.01)
*G06F 13/00* (2006.01)
(52) U.S. Cl. ..................... 711/128; 711/140
(58) Field of Classification Search .......... 711/118, 711/128, 136, 269, 202, 206, 140; 713/320
See application file for complete search history.

(56) References Cited

U.S. PATENT DOCUMENTS

| | | |
|---|---|---|
| 5,091,851 A | 2/1992 | Shelton et al. |
| 5,109,520 A | 4/1992 | Knierim |
| 5,325,511 A | 6/1994 | Collins et al. |
| 5,493,523 A | 2/1996 | Huffman |
| 5,493,667 A | 2/1996 | Huck et al. |
| 5,510,934 A | 4/1996 | Brennen et al. |
| 5,526,504 A | 6/1996 | Hsu et al. |
| 5,537,538 A | 7/1996 | Bratt et al. |
| 5,546,545 A | 8/1996 | Rich |

(Continued)

FOREIGN PATENT DOCUMENTS

GB     2304215 A    3/1997

(Continued)

OTHER PUBLICATIONS

ADSP-21535 Blackfin™ DSP Brochure, Analog Devices, Inc., 4 pages (2001).

(Continued)

*Primary Examiner*—Hong Kim
(74) *Attorney, Agent, or Firm*—Sterne, Kessler, Goldstein & Fox PLLC (57) ABSTRACT

Processors and systems having a micro tag array that reduces data cache access power. The processors and systems include a cache that has a plurality of datarams, a processor pipeline register, and a micro tag array. The micro tag array is coupled to the cache and the processor pipeline register. The micro tag array stores base address data bits or base register data bits, offset data bits, a carry bit, and way selection data bits. When a LOAD or a STORE instruction is fetched, at least a portion of the base address and at least a portion of the offset of the instruction are compared to data stored in the micro tag array. If a micro tag array hit occurs, the micro tag array generates a cache dataram enable signal. This signal enables only a single dataram of the cache.

25 Claims, 6 Drawing Sheets

U.S. PATENT DOCUMENTS

| | | | |
|---|---|---|---|
| 5,568,630 | A | 10/1996 | Killian et al. |
| 5,572,704 | A | 11/1996 | Bratt et al. |
| 5,586,278 | A | 12/1996 | Papworth et al. |
| 5,604,909 | A | 2/1997 | Joshi et al. |
| 5,606,683 | A | 2/1997 | Riordan |
| 5,632,025 | A | 5/1997 | Bratt et al. |
| 5,670,898 | A | 9/1997 | Fang |
| 5,734,881 | A | 3/1998 | White et al. |
| 5,740,402 | A | 4/1998 | Bratt et al. |
| 5,758,112 | A | 5/1998 | Yeager et al. |
| 5,764,999 | A | 6/1998 | Wilcox et al. |
| 5,765,037 | A | 6/1998 | Morrison et al. |
| 5,781,753 | A | 7/1998 | McFarland et al. |
| 5,784,584 | A | 7/1998 | Moore et al. |
| 5,799,165 | A | 8/1998 | Favor et al. |
| 5,802,339 | A | 9/1998 | Sowadsky et al. |
| 5,802,386 | A | 9/1998 | Kahle et al. |
| 5,809,326 | A | 9/1998 | Nogami |
| 5,809,336 | A | 9/1998 | Moore et al. |
| 5,848,433 | A | 12/1998 | Tran et al. |
| 5,860,151 | A * | 1/1999 | Austin et al. ............... 711/213 |
| 5,881,257 | A | 3/1999 | Glass et al. |
| 5,884,061 | A | 3/1999 | Hesson et al. |
| 5,954,815 | A | 9/1999 | Joshi et al. |
| 5,961,629 | A | 10/1999 | Nguyen et al. |
| 5,966,734 | A | 10/1999 | Mohamed et al. |
| 6,044,478 | A | 3/2000 | Green |
| 6,076,159 | A | 6/2000 | Fleck et al. |
| 6,079,014 | A | 6/2000 | Papworth et al. |
| 6,085,315 | A | 7/2000 | Fleck et al. |
| 6,216,200 | B1 | 4/2001 | Yeager |
| 6,223,278 | B1 | 4/2001 | Morrison |
| 6,247,124 | B1 | 6/2001 | Joshi et al. |
| 6,249,862 | B1 | 6/2001 | Chinnakonda et al. |
| 6,266,755 | B1 | 7/2001 | Yeager |
| 6,269,436 | B1 | 7/2001 | Tran et al. |
| 6,298,438 | B1 | 10/2001 | Thayer et al. |
| 6,304,960 | B1 | 10/2001 | Yeh et al. |
| 6,308,252 | B1 | 10/2001 | Agarwal et al. |
| 6,374,342 | B1 * | 4/2002 | Sasahara ............... 711/207 |
| 6,393,550 | B1 | 5/2002 | Fetterman |
| 6,418,520 | B1 * | 7/2002 | Hayakawa et al. ........ 711/203 |
| 6,430,655 | B1 | 8/2002 | Courtright et al. |
| 6,473,837 | B1 | 10/2002 | Hughes et al. |
| 6,477,639 | B1 | 11/2002 | Krishnan et al. |
| 6,505,285 | B1 | 1/2003 | Rabinovici et al. |
| 6,546,477 | B1 | 4/2003 | Russo et al. |
| 6,557,127 | B1 | 4/2003 | Adams et al. |
| 6,594,728 | B1 | 7/2003 | Yeager |
| 6,598,148 | B1 | 7/2003 | Moore et al. |
| 6,691,221 | B2 | 2/2004 | Joshi et al. |
| 6,757,817 | B1 | 6/2004 | Booth |
| 6,760,835 | B1 | 7/2004 | Yu |
| 6,836,833 | B1 | 12/2004 | Kinter et al. |
| 6,915,395 | B1 | 7/2005 | Singh |
| 7,003,630 | B1 * | 2/2006 | Kissell ............... 711/141 |
| 7,032,226 | B1 | 4/2006 | Nemirovsky et al. |
| 2003/0225980 | A1 * | 12/2003 | Henry et al. ............. 711/144 |
| 2004/0158683 | A1 * | 8/2004 | Thatipelli et al. ......... 711/146 |
| 2004/0193858 | A1 | 9/2004 | Ahmad et al. |
| 2005/0050277 | A1 * | 3/2005 | Shen et al. ............. 711/118 |
| 2005/0050278 | A1 * | 3/2005 | Meier et al. ............. 711/128 |
| 2005/0102483 | A1 | 5/2005 | Kinter et al. |
| 2005/0125629 | A1 * | 6/2005 | Kissell ............... 712/1 |
| 2005/0125795 | A1 * | 6/2005 | Kissell ............... 718/100 |
| 2005/0246499 | A1 | 11/2005 | Saida et al. |
| 2006/0047935 | A1 * | 3/2006 | Ramaraju et al. .......... 711/207 |
| 2006/0090034 | A1 * | 4/2006 | Ishihara et al. ............ 711/118 |
| 2006/0095732 | A1 | 5/2006 | Tran et al. |
| 2006/0149904 | A1 | 7/2006 | Mowry |
| 2006/0259747 | A1 | 11/2006 | Gonzalez et al. |

FOREIGN PATENT DOCUMENTS

| | | |
|---|---|---|
| GB | 2322718 A | 9/1998 |
| WO | WO 02/082278 A1 | 10/2002 |

OTHER PUBLICATIONS

*Andes R10000 User's Manual*, Revision 2.0, MIPS Technologies, Inc., Entire Text (Sep. 19, 1996).

Arvind, A. and Maessen, J.-W., "Memory Model = Instruction Reordering + Store Atomicity," *ACM SIGARCH Comptuer Architecture News*, vol. 34, Issue 2, pp. 29-40 (May 2006).

Banakar, R. et al., "Scratchpad Memory: A Design Alternative for Cache On-chip memory in Embedded Systems," *Proceedings of Codes '02*, ACM, Estes Park, Colorado, pp. 73-78 (May 2002).

Bellas, N. et al., "Architectural and Compiler Techniques for Energy Reduction in High-Performance Microprocessors," *IEEE Trans. on Very Large Scale Integration (VLSI) Systems*, vol. 8, No. 3, pp. 317-326 (Jun. 2000).

Bird, P.L. et al., "The Effectiveness of Decoupling," *Proceedings of the 7th Int'l Conference on Supercomputing*, pp. 47-56, ACM Press, New York, NY (1993).

Bratt, J.P. et al., U.S. Appl. No. 08/168,094, filed Dec. 15, 1993, entitled "Superscalar Microprocessor Instruction Pipeline Including Instruction Dispatching and Kill Control".

Buti, T.N. et al., "Organization and implementation of the register-renaming mapper for out-of-order IBM POWER4 processors," *IBM J. Res. & Dev.* 49(1):167-188, International Business Machines Corporation (Jan. 2005).

Cotterell, S. and Vahid, F., "Tuning of Loop Cache Architecture to Programs in Embedded System Design," *ISSS'02*, 6 pages (Oct. 2002).

Courtright, D., "Introducing: The MIPS32™ 4Kc™ and MIPS32™ 4Kp™ Processor Cores 'Jade'," paper copy of slide presentation distributed at the Embedded Microprocessor Forum, pp. 1-25 (May 1999).

Dally, W.J. et al., U.S. Appl. No. 09/637,500, filed Aug. 11, 2000, entitled "High Performance RISC Instruction Set Digital Signal Processor Having Circular Buffer And Looping Controls".

De Vries, H., *Understanding the detailed Architecture of AMD's 64 bit Core*, 85 pages, printed Oct. 16, 2007 from http://chip-architect.com/news/2003_09_21_Detailed_Architecture_of_AMDs_64bit_Core.html (Sep. 21, 2003).

Flynn et al., "Using Simple Tools to Evaluate Complex Architectural Trade-Offs," *IEEE Micro*, pp. 67-75 (Jul.-Aug. 2000).

Fukuoka, K. et al., "Leakage Power Reduction for Clock Gating Scheme on PD-SOI," *IEEE Computer Society Int'l Symp. on Circuits and Systems*, pp. 613-616 (2004).

Goodman, J.R. et al., "PIPE: A VLSI Decoupled Architecture," *ACM SIGARCH Computer Architecture News*, pp. 20-27, ACM Press, New York, NY (Jun. 1985).

Gwennap, L., "MIPS R10000 Uses Decoupled Architecture," *Microprocessor Report*, vol. 8, No. 14, pp. 1-5 (Oct. 24, 1994).

Gwennap, L., "MIPS R12000 to Hit 300 MHz," *Microprocessor Report*, vol. 11, No. 13, pp. 1-4 (Oct. 6, 1997).

Gwennap, L., "MIPS Roadmap Focuses on Bandwidth," *Microprocessor Report*, pp. 1-3 (May 12, 1997).

Gwennap, L., "SGI Provides Overview of TFP CPU," *Microprocessor Report*, vol. 7, No. 2, pp. 1-2 (Feb. 15, 1993).

Gwennap, L., "TFP Designed for Tremendous Floating Point," *Microprocessor Report*, vol. 7, No. 11, pp. 1-5 (Aug. 23, 1993).

Hennessy, J.L. and Patterson, D.A., *Computer Architecture: A Quantitative Approach—Third Edition*, Morgan Kaufmann Publishers, ISBN 1-55860-724-2, pp. 608-609 (2003).

*Intel Architecture Software Developer's Manual*—vol. 2: Instruction Set Reference, Intel. Corporation, pp. 3-278 and 3-279 (1997).

*Intel Architecture Software Developer's Manual*, vol. 1-3, pp. 2-7, 2-10, 2-11, 2-12, 3-329, 9-16, A-10, and A-20 (1999).

*Intel® StrongARM® SA-1100 Microprocessor Developer's Manual*, Intel. Corporation, pp. i-xix, 1-1 through 1-7, 2-1 through 2-8, and 6-1 through 6-7 (Aug. 1999).

Kandemir, M. et al., "Dynamic Management of Scratch-Pad Memory Space," *Proceedings of the 38th Design Automation Conference*, ACM, Las Vegas, Nevada, pp. 690-695 (Jun. 2001).

Kandemir, M. et al., "Exploiting Scratch Pad Memory Using Presburger Formulas," *Proceedings of ISSS '01*, ACM, Montreal, Quebec, Canada, pp. 7-12 (Oct. 2001).

Kandemir, M. et al., "Exploiting Shared Scratch Pad Memory Space in Embedded Multiprocessor Systems," *Proceedings of the 39th Design Automation Conference*, ACM, New Orleans, Louisiana, pp. 219-224 (Jun. 2002).

Kiyohara, T. et al., "Register Connection: A New Approach to Adding Registers into Instruction Set Architectures," *Int'l Conf. on Computer Architecture—Proc. of the 20th Annual Int'l. Symp. on Computer Architecture*, San Diego, CA, pp. 247-256 (1993).

Krewell, K., "Intel Looks to Core For Success", Microprocessor Report, vol. 20, pp. 1, 4, 5 and 6 (Mar. 2006).

Lee, L.H. et al., "Instruction Fetch Energy Reduction Using Loop Caches For Embedded Applications with Small Tight Loops," *ISLPED'99*, pp. 267-269 (1999).

Lipasti, M. et al., "Physical Register Inlining," at <http://www.ece.wisc.edu/~pharm/papers/isca2004_egunadi.pdf>, 11 pages (retrieved Jun. 12, 2006).

Merten, M.C. et al., "Modulo Schedule Buffers", IEEE, pp. 138-149 (Dec. 2001).

*MIPS R10000 Microprocessor User's Manual, Version 2.0*, MIPS Technologies, Inc., 424 pages (Jan. 29, 1997).

Nass, R., "Latest DSPs Poised to Drive 3G Revolution," *Portable Design* 8(9):26, 27, 28, 32, and 34, PennWell Corporation, Fair Lawn, New Jersey (Sep. 2001).

Nemirovsky, M. et al., U.S. Appl. No. 09/602,279, filed Jun. 23, 2000, entitled "Methods and Apparatus for Background Memory Management".

Osborne, M. et al.,"Superscalar Pipeline Architectures," Slide Presentation, 36 pages, downloaded Jun. 19, 2007 from http://www.academic.marist.edu/~jzbv/architecture/projects2004/SuperscalarArchitectures.ppt (Apr. 19, 2004).

Panda, P. et al., "Data Memory Organization and Optimizations in Application-Specific Systems," *IEEE Design & Test of Computers*, IEEE, pp. 56-68 (May 2001).

Panda, P. et al., "Efficient Utilization of Scratch-Pad Memory in Embedded Processor Applications," *Proceedings of the European Design & Test Conference ED&TC 97*, IEEE, Paris France, pp. 7-11 (Mar. 1997).

Peng, M. and Azgomi, S., "Content-Addressable memory (CAM) and its network applications," at http://www.eetasia.com/ARTICLES/2000MAY/2000MAY03_MEM_NTEK_TAC.PDF, 3 pages (retrieved Jun. 12, 2006).

Pierce, J. and Mudge, T., "Wrong-Path Instruction Prefetching," *IEEE Computer Society 29th Int'l. Symp. on Microarchitecture*, pp. 165-175 (1996).

Price, C., *MIPS R10000 MIPS IV ISA Manual: Andes*, Revision 3.2, MIPS Technologies, Inc., 323 pages (Sep. 1995).

Rhodes, S., *MIPS R8000 Microprocessor Chip Set User's Manual*, Revision 3.0, Silicon Graphics, Inc., 352 pages (Jul. 1994).

Schmidt, D.C., "Transparently Parameterizing Synchronization into a Concurrent Distributed Application: A Case Study of C++ Design Evolution," *C++ Report*, SIGS Publications, vol. 6, No. 3, 10 pages (Jul.-Aug. 1994).

Smith, J.E. et al., "The ZS-1 Central Processor," *Proceedings of the Second Int'l Conference on Architectural Support for Programming Languages and Operating Systems*, pp. 199-204, IEEE Computer Society Press, Los Alamitos, CA (1987).

Smith, J.E., "Retrospective: Decoupled Access/Execute Computer Architectures," *25 Years of the international Symposia on Computer Architecture (Selected Papers)*, pp. 27-28, ACM Press, New York, NY (Jun. 1998).

Solomon, B. et al., "Micro-Operation Cache: A Power Aware Frontend for Variable Instruction Length ISA," *Symp. on Low Power Electronics and Design*, pp. 4-9 (Aug. 2001).

*SPARC64 V Processor For UNIX Server*, Revision 1.0, Fujitsu Limited, 24 pages (Aug. 2004).

Sung, M. et al., "Multithreading Decoupled Architectures for Complexity-Effective General Purpose Computing," *ACM SIGARCH Computer Architecture News*, vol. 29—Issue 5, pp. 56-61, ACM Press, New York, NY (Dec. 2001).

Taylor, M., *The Raw Prototype Design Document*, Dept. of Electrical Engineering and Computer Science—Massachusetts Institute of Technology, pp. 1, 5, 6, 10, and 53 (Nov. 1999).

$V_R$*Series™ User's Manual:$V_R$10000™ Microprocessor, Version 1.0*, NEC, Entire Text (Nov. 1995).

Watts, C. et al., "ARM Intelligent Energy Manager Future Evolution," paper copy of slide presentation distributed at the ARM Developers' Conference '04, 34 sheets (Oct. 2004).

Yeager, K.C., "The MIPS R10000 Superscalar Microprocessor," *IEEE Micro*, pp. 28-40 (1996).

Knoth, M. and Kinter, R.C., U.S. Appl. No. 11/505,869, filed Aug. 18, 2006, entitled "Methods for Reducing Data Cache Access Power in a Processor, and Applications Thereof".

\* cited by examiner

MICRO TAG ARRAY HAVING WAY SELECTION BITS FOR REDUCING DATA CACHE ACCESS POWER

CROSS REFERENCE TO RELATED APPLICATION

This application is related to commonly owned U.S. Patent Application Ser. No. 11/505,869, titled "METHODS FOR REDUCING DATA CACHE ACCESS POWER IN A PROCESSOR, AND APPLICATIONS THEREOF," filed on Aug. 18, 2006 (now pending) which is incorporated herein by reference in its entirety.

FIELD OF THE INVENTION

The present invention relates generally to processors and more particularly to reducing cache access power in a processor.

BACKGROUND OF THE INVENTION

Many processors have a cache. A cache is a block of memory for temporary storage of data that can be accessed by a processor more quickly than main memory. The cache array is typically indexed by a subset of the address bits and tagged with the remaining address bits. In a set-associative cache, each index in the cache can hold multiple memory locations. For example, a 4 way set-associative cache can hold 4 memory locations at each cache index. A typical set-associative cache has one or more arrays holding the tag values, referred to as the tagrams, and one or more arrays holding the data values, referred to as datarams. For fast access, it is common to implement each way of the data in a separate dataram.

In order to operate a processor at or near its peak performance, the tagrams and datarams of a cache of a conventional processor are energized and accessed in parallel during each memory read and each memory write operation. Following each operation (e.g., in which a cache hit occurs), a selection process chooses the contents of one of the datarams of the cache and supplies this contents to the processor. The contents of the remaining datarams are disregarded.

While this conventional cache access technique works, energizing a tagram and multiple datarams during each memory read and each memory write operation of a processor wastes energy. What is needed are new techniques and means for accessing a cache that overcome the limitations associated with conventional cache access techniques and means.

BRIEF SUMMARY OF THE INVENTION

The present invention provides processors and systems having a micro tag array that reduces data cache access power. The processors and systems include a cache that has a plurality of datarams, a processor pipeline register, and a micro tag array. The micro tag array is coupled to the cache and the processor pipeline register. The micro tag array stores base address data bits or base register data bits, offset data bits, a carry bit, and way selection data bits. When a LOAD or a STORE instruction is fetched, at least a portion of the base address and at least a portion of the offset of the instruction are compared to data stored in the micro tag array. If a micro tag array hit occurs, the micro tag array generates a cache dataram enable signal. This signal enables only a single dataram of the cache. If a micro tag array hit occurs, a signal is also generated that disables the cache tagram.

It is a feature of the present invention that it uses early stages of a processing pipeline to derive usable cache way selection information. This information, which is based on previous way selection information, is used to determine which dataram of a cache stores needed data and to actively conserve power by enabling only the dataram containing the needed data.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention is described with reference to the accompanying drawings. The drawing in which an element first appears is typically indicated by the leftmost digit or digits in the corresponding reference number.

DETAILED DESCRIPTION OF THE INVENTION

The present invention provides processors and systems having a micro tag array that reduces data cache access power, and applications thereof. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
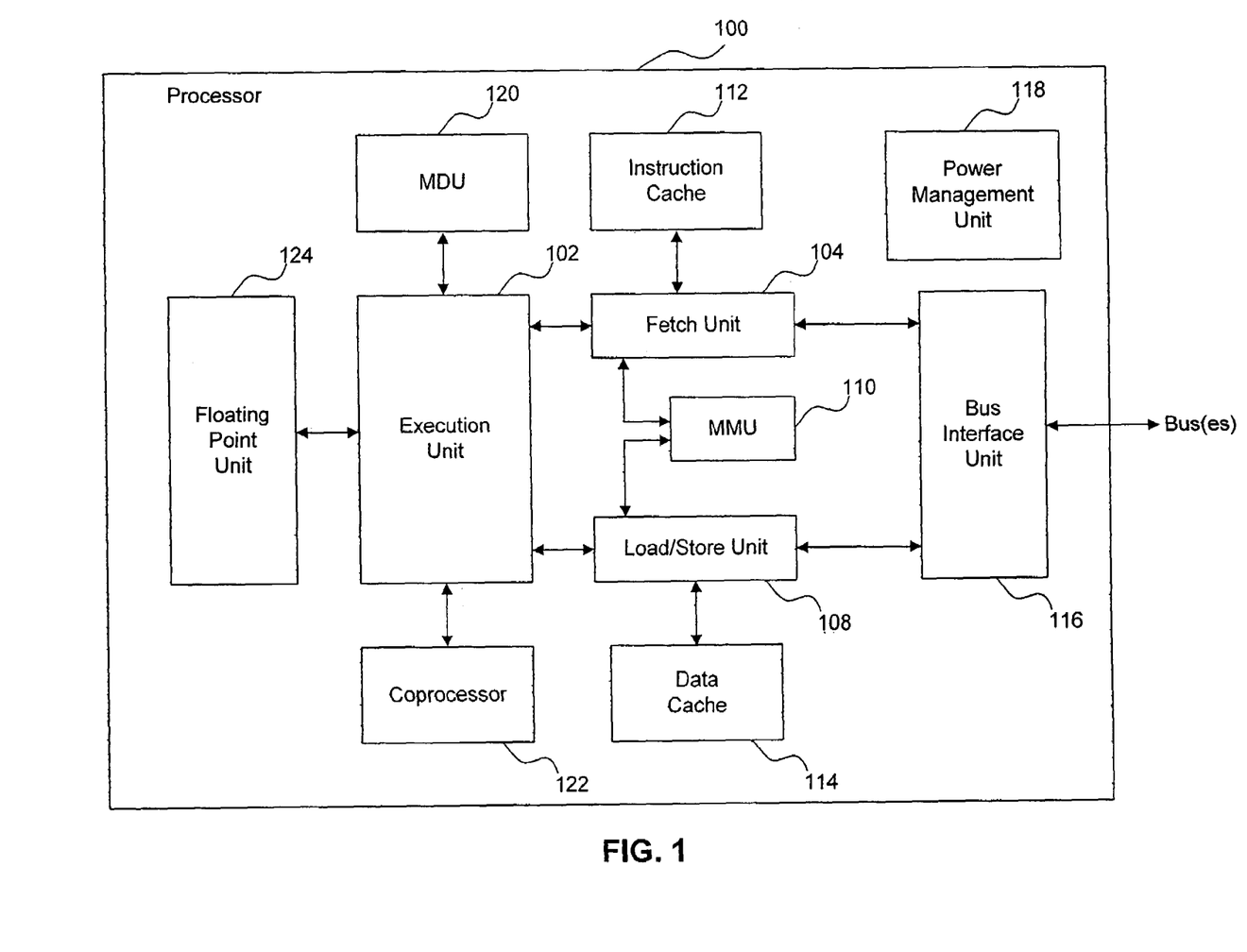
FIG. 1 is a diagram of a processor according to an embodiment of the present invention.

FIG. 1 is a diagram of a processor 100 according to an embodiment of the present invention. As shown in FIG. 1, processor 100 includes an execution unit 102, a fetch unit 104, a floating point unit 106, a load/store unit 108, a memory management unit (MMU) 110, an instruction cache 112, a data cache 114, a bus interface unit 116, a power management unit 118, a multiply/divide unit (MDU) 120, and a coprocessor 122. While processor 100 is described herein as including several separate components, many of these components are optional components that will not be present in each embodiment of the present invention, or components that may be combined, for example, so that the functionality of two components reside within a single component. Thus, the individual components shown in FIG. 1 are illustrative and not intended to limit the present invention.

Execution unit 102 preferably implements a load-store (RISC) architecture with arithmetic logic unit operations (e.g., logical, shift, add, subtract, etc.). In one embodiment, execution unit 102 includes 32-bit general purpose registers (not shown) used for scalar integer operations and address calculations. Optionally, one or more additional register file sets can be included to minimize content switching overhead, for example, during interrupt and/or exception processing. Execution unit 102 interfaces with fetch unit 104, floating point unit 106, load/store unit 108, multiple-divide unit 120 and coprocessor 122.

Fetch unit 104 is responsible for providing instructions to execution unit 102. In one embodiment, fetch unit 104 includes control logic for instruction cache 112, a recorder for recoding compressed format instructions, dynamic branch prediction, an instruction buffer to decouple operation of fetch unit 104 from execution unit 102, and an interface to a scratch pad (not shown). Fetch unit 104 interfaces with execution unit 102, memory management unit 110, instruction cache 112, and bus interface unit 116.

Floating point unit 106 interfaces with execution unit 102 and operates on non-integer data. As many applications do not require the functionality of a floating point unit, this component of processor 100 will not be present in all embodiments of the present invention.

Load/store unit 108 is responsible for data loads and stores, and includes data cache control logic. Load/store unit 108 interfaces with data cache 114 and other memory such as, for example, a scratch pad and/or a fill buffer. Load/store unit 108 also interfaces with memory management unit 110 and bus interface unit 116.

Memory management unit 110 translates virtual addresses to physical addresses for memory access. In one embodiment, memory management unit 110 includes a translation lookaside buffer (TLB) and may include a separate instruction TLB and a separate data TLB. Memory management unit 110 interfaces with fetch unit 104 and load/store unit 108.

Instruction cache 112 is an on-chip memory array organized as a multi-way set associative cache such as, for example, a 2-way set associative cache or a 4-way set associative cache. Instruction cache 112 is preferably virtually indexed and physically tagged, thereby allowing virtual-to-physical address translations to occur in parallel with cache accesses. In one embodiment, the tags include a valid bit and optional parity bits in addition to physical address bits. Instruction cache 112 interfaces with fetch unit 104.

Data cache 114 is also an on-chip memory array. Data cache 114 is preferably virtually indexed and physically tagged. In one embodiment, the tags include a valid bit and optional parity bits in addition to physical address bits. As described in more detail below, it is a feature of the present invention that components of data cache 114 can be selectively enabled and disabled to reduce the total power consumed by processor 100. Data cache 114 interfaces with load/store unit 108.

Bus interface unit 116 controls external interface signals for processor 100. In one embodiment, bus interface unit 116 includes a collapsing write buffer used to merge write-through transactions and gather writes from uncached stores.

Power management unit 118 provides a number of power management features, including low-power design features, active power management features, and power-down modes of operation. In one embodiment, processor 100 implements a wait instruction that signals to selected components of processor 100 that execution and/or clocking should be halted, thereby reducing power consumption during the idle period. These power management features are in addition to the power saving features described herein with reference, for example, to FIGS. 2-5.

Multiply/divide unit 120 performs multiply and divide operations for processor 100. In one embodiment, multiply/divide unit 120 preferably includes a pipelined multiplier, result and accumulation registers, and multiply and divide state machines, as well as all the control logic required to perform, for example, multiply, multiply-add, and divide functions. As shown in FIG. 1, multiply/divide unit 120 interfaces with execution unit 102.

Coprocessor 122 performs various overhead functions for processor 100. In one embodiment, coprocessor 122 is responsible for virtual-to-physical address translations, implementing cache protocols, exception handling, operating mode selection, and enabling/disabling interrupt functions. Coprocessor 122 interfaces with execution unit 102.

Figure 2:
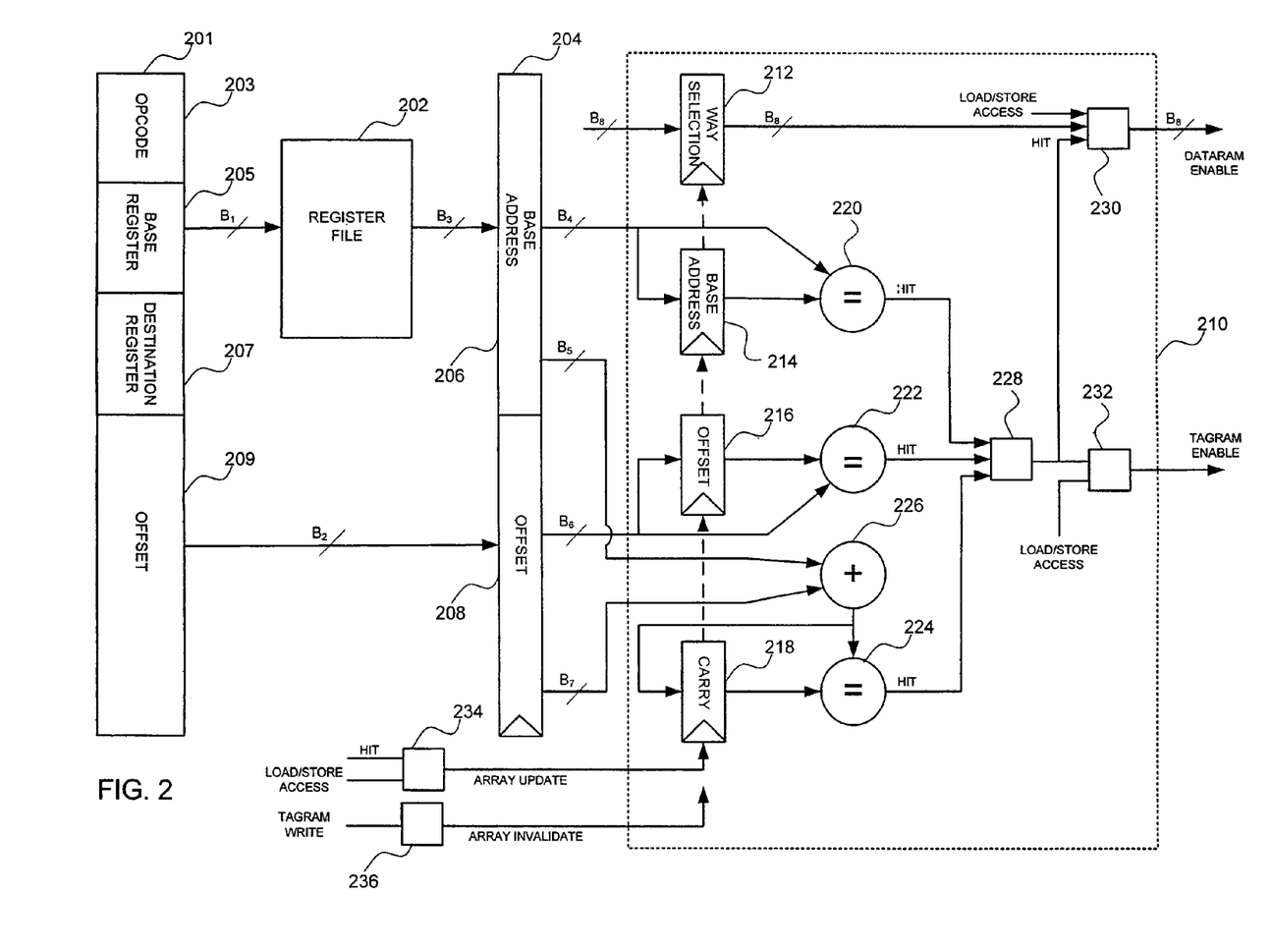
FIG. 2 is a diagram of a processor having a micro tag array according to a first embodiment of the present invention.

FIG. 2 is a diagram of a processor having a micro tag array 210 according to an embodiment of the present invention. In addition to micro tag array 210, the processor includes a register file 202 and a processor pipeline register 204.

As shown in FIG. 2, micro tag array 210 includes registers 212, 214, 216, and 218. These four registers comprise an array entry of micro tag 210.

Micro tag array 210 also includes comparators 220, 222, and 224, an adder 226, and control logic 228, 230, and 232. Micro tag array 210 is coupled to processor pipeline register 204.

Register 212 is used to store way selection data bits. The stored way selection data bits identify a particular dataram of a cache such as data cache 114, shown in FIG. 1. The number of bits stored in register 212 is $B_8$. In one embodiment, $B_8$ is 4 bits with a 1-hot encoding indicating which of the 4 ways was used in a previous cache access.

Register 214 is used to store base address data bits. The bits stored in register 214 are provided to register 214 by a base address portion 206 of pipeline processor register 204. The number of bits stored in register 212 is $B_4$. In one embodiment, $B_4$ is the upper twenty-seven bits of a thirty-two bit memory base address. In other embodiments, more than or less than twenty-seven bits may be stored.

Register 216 is used to store offset data bits. The bits stored in register 216 are provided to register 216 by an offset portion 208 of pipeline processor register 204. The number of bits stored in register 216 is $B_6$. In one embodiment, $B_6$ is the upper eleven bits of a sixteen bit memory offset. In other embodiments, more than or less than eleven bits may be stored.

Register 218 is used to store a carry bit. The carry bit stored in register 218 is generated by adder 226.

As shown in FIG. 2, data bits are read into registers 212, 214, 216, and 218 whenever an array update signal is applied to these registers. This array update signal is generated by control logic 234. Data is cleared from registers 212, 214, 216, and 218 (or marked as invalid) whenever an array invalidate signal is applied to these registers. This array invalidate signal is generated by control logic 236.

Comparator 220 of micro tag array 210 is coupled to register 214 and base address portion 206 of processor pipeline register 204. Comparator 220 compares bits stored in base address portion 206 of processor pipeline register 204 to bits stored in register 214. If the two sets of bits match, comparator 220 generates a hit signal. Otherwise, comparator 220 generates a miss signal. The output signal of comparator 220 is provided to control logic 228.

Comparator 222 of micro tag array 210 is coupled to register 216 and offset portion 208 of processor pipeline register 204. Comparator 222 compares bits stored in offset portion 208 of processor pipeline register 204 to bits stored in register 216. If the two sets of bits match, comparator 222 generates a hit signal. Otherwise, comparator 222 generates a miss signal. The output signal of comparator 222 is provided to control logic 228.

Comparator 224 of micro tag array 210 is coupled to register 218 and adder 226. Comparator 224 compares the carry bit stored in register 218 to a carry bit generated by adder 226. If the two carry bits match, comparator 224 generates a hit signal. Otherwise, comparator 224 generates a miss signal. The output signal of comparator 224 is provided to control logic 228.

Adder 226 adds bits $B_5$ stored in base address portion 206 of processor pipeline register 204 to bits $B_7$ stored in offset portion 208 of processor pipeline register 204 and generates a carry bit. This carry bit is provided to comparator 224. The carry bit is also stored in register 218. In one embodiment, adder 226 adds the lower five bits of a memory base address stored in base address portion 206 of processor pipeline register 204 to the lower five bits of a memory offset stored in offset portion 208 of processor pipeline register 204. In other embodiments, more than or less than five bits may be added by adder 226.

Control logic 228 generates a micro tag array entry hit signal if each of the comparators 220, 222, and 224 generate a hit signal. Otherwise, control logic 228 generates a miss signal. The output signal of control logic 228 is provided to control logic 230 and control logic 232.

Control logic 230 is used to generate a dataram enable signal. The inputs to control logic 230 are the output signal of control logic 228, a LOAD/STORE ACCESS signal, and the way selection data bits stored in register 212.

Control logic 232 is used to generate a tagram enable signal. The inputs to control logic 232 are the output signal of control logic 228 and a LOAD/STORE ACCESS signal.

Figure 3:
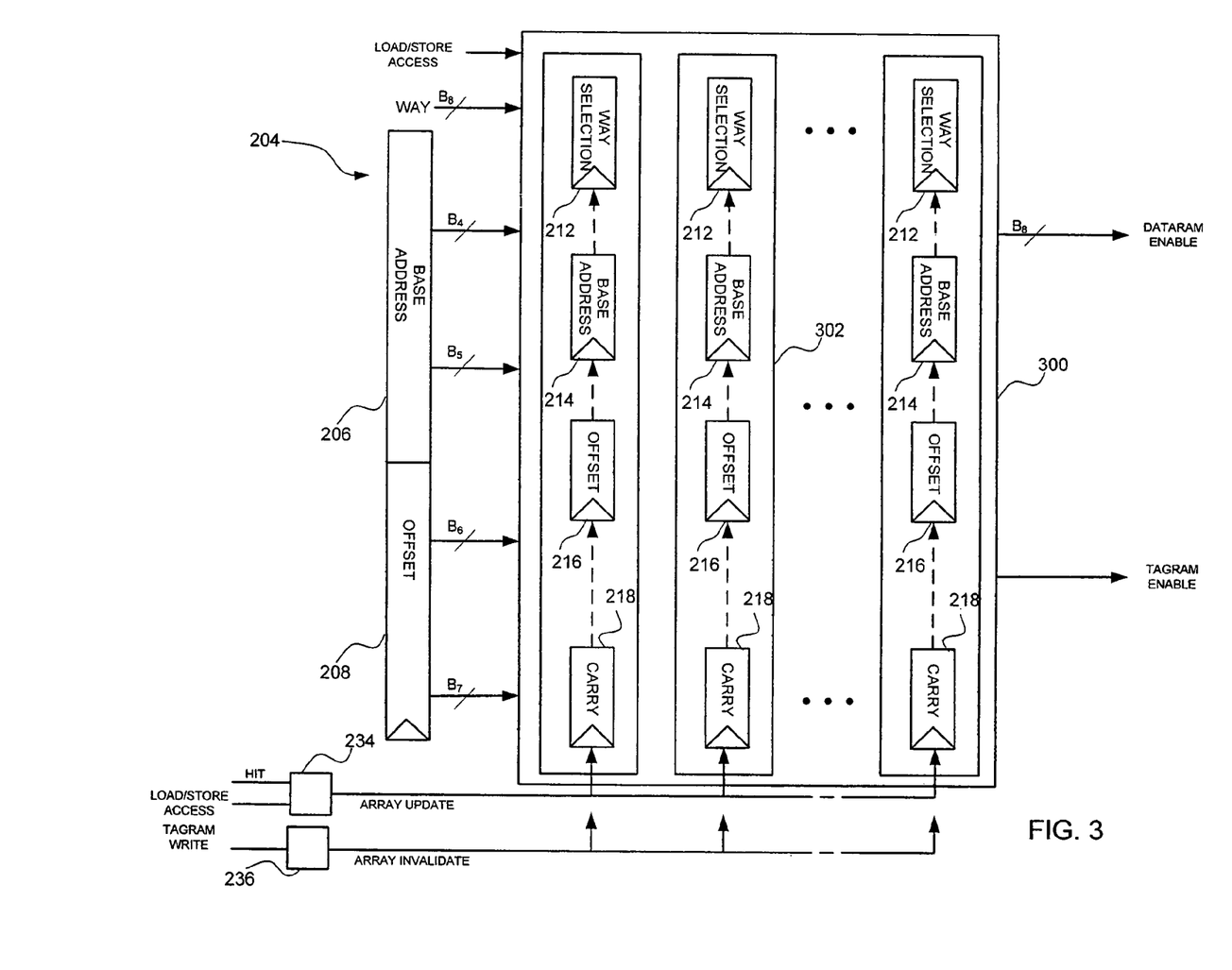
FIG. 3 is a diagram of a processor having a micro tag array according to a second embodiment of the present invention.

FIG. 3 is a diagram of a processor having a micro tag array 300 according to an embodiment of the present invention. Micro tag array 300 includes a plurality of array entries 302. In preferred embodiments of the present invention, micro tag array 300 includes from one to four array entries 302. The invention is not limited, however, to having between one and four array entries. As described in more detail below, micro tag array 300 is a multi-entry micro tag array that operates in a manner similar to micro tag array 210.

The processors of FIGS. 2 and 3 operate as follows. An instruction 201 is fetched by the processor. In an embodiment, instruction 201 is a LOAD or a STORE instruction having an opcode 203, a base register value 205, a destination (or source) register value 207, and an offset value 209. The base register value includes $B_1$ bits that are used to transfer a base address value stored in register file 202 to base address portion 206 of processor pipeline register 204. The offset value 209 includes $B_2$ bits, which are stored in offset portion 208 of processor pipeline register 204.

A subset of the bits stored in base address portion 206 of processor pipeline register 204 is compared using comparator 220 to bits stored in register 214. This comparison determines whether the base address of instruction 201 matches a base address stored in an array entry of the micro tag array.

A subset of the bits stored in offset portion 208 of processor pipeline register 204 is compared using comparator 222 to bits stored in register 216. This comparison determines if there is a match of the offset value of instruction 201 to an offset value stored in an entry of the micro tag array.

In order to find matches within the range of a particular dataram and to eliminate neighbor set accesses, adder 226 adds bits $B_5$ and $B_7$ of pipeline processor register 204 (e.g., the lower five bits of the base address value and the offset value of instruction 201) to generate a carry value. This carry value is then compared to a carry value stored in register 218.

If each of the comparators 220, 222, and 224 associated with a particular entry of the micro tag array generates a hit signal, control logic 228 generates a hit signal, which causes control logic 230 to enable a single dataram specified by bits stored in register 212. This also disables the tagram.

In one embodiment, each of the registers 212, 214, 216, and 218 are set to zero at start-up of the processor. The first LOAD or STORE instruction executed by the processor will access the data cache without a micro tag array hit. Thus, the cache will be accessed in a conventional manner. However, the outcome of the cache tag comparison will yield way selection information that will be stored in register 212 of an array entry of the micro tag array. The base address value and the offset value of the instruction will also be stored in the array entry. This information will then be available for use with the next LOAD or STORE instruction executed by the processor.

If the next LOAD or STORE instruction does not create a hit within the first entry of the micro tag array, another micro tag array entry is found and the access information is stored as described above. This fill process will continue until all available entries of the micro tag array are filled. In an embodiment, when this occurs, the first entry of the micro tag array is again declared eligible for data storage. Such a replacement scheme is commonly referred to as a least recently filled replacement scheme, and it is easily implemented using a shift register (e.g., a 1-hot N-bit shift register). Other replacement schemes such as, for example, a least recently used scheme are implemented in other embodiments of the present invention.

In one embodiment, because refill operations are a relatively rare event compared to LOAD/STORE access events, control logic 236 invalidates all of the array entries of the micro tag array whenever a tagram write occurs. In another embodiment, control logic 236 selectively invalidates only array entries of the micro tag array whose way selection data bits correspond to an intended refill way of the cache. This embodiment, improves the efficiency of the micro tag array.

Because the micro tag array is comparing virtual addresses, the array will need to be invalidated when the virtual to physical address translation changes. This change could be the result of a write to the TLB array or a change in the current address space. These are relatively rare events and invalidating the entire array does not significantly reduce the efficiency of the micro tag array. In an alternative embodiment, including an address space identifier in the micro TLB would remove the need to invalidate on a change of address space. In another embodiment, only TLB writes that impact the particular virtual page used in the micro tag array would cause an invalidation.

Figure 4:
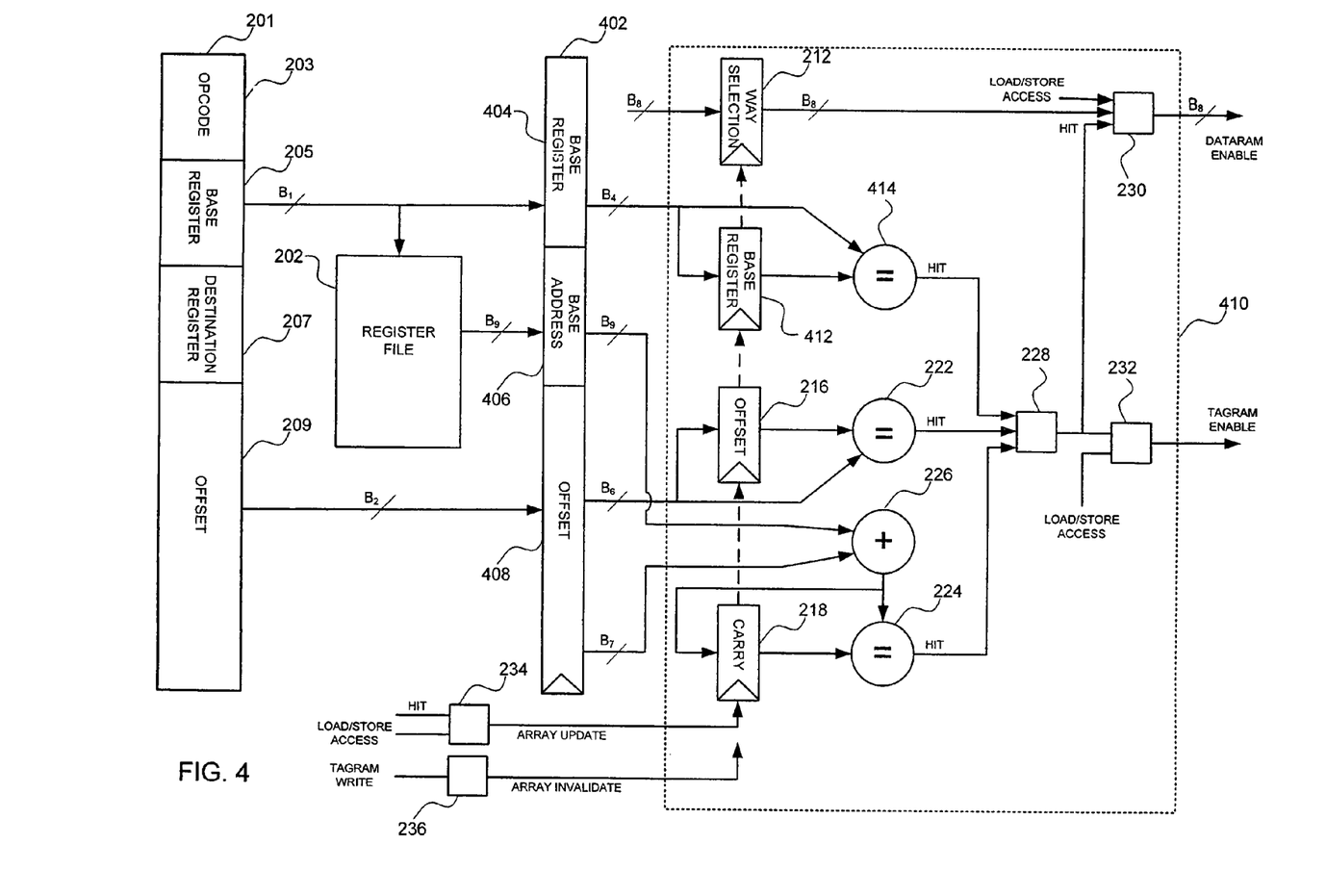
FIG. 4 is a diagram of a processor having a micro tag array according to a third embodiment of the present invention.

FIG. 4 is a diagram of a processor having a micro tag array 410 according to an embodiment of the present invention. As shown in FIG. 4, micro tag array 410 includes registers 212, 414, 216, and 218. These four registers comprise an array entry of micro tag 410. Micro tag array 410 also includes comparators 414, 222, and 224, an adder 226, and control logic 228, 230, and 232. Micro tag array 410 is coupled to a processor pipeline register 402.

Register 212 is used to store way selection data bits. The stored way selection data bits identify a particular dataram of a cache such as data cache 114, shown in FIG. 1. The number of bits stored in register 212 is $B_8$. In one embodiment, $B_8$ is 4 bits with a 1-hot encoding indicating which of the 4 ways was used in a previous cache access.

Register 414 is used to store base register data bits. The bits stored in register 414 are provided to register 414 by the base register portion 404 of processor pipeline register 402. The number of bits stored in register 412 is $B_4$. In one embodiment, the number of bits stored in register 414 is equal to the number of bits contained in base register value 205 of instruction 201. In another embodiment, a different number of bits may be stored in register 414, for example, if instruction 201 is a compressed format instruction and zeros are added to the bits $B_1$ to make the base register value compatible with the base register values of normal format instructions.

As shown in FIG. 4, processor pipeline register 402 also stores base address bits $B_9$ in a based address portion 406 of processor pipeline register 402. These bits come from a register of register file 202, which is associated with base register value 205 of instruction 201. In one embodiment, the bits $B_9$ are the lower five bits of the memory base address value stored in register file 202.

Register 216 is used to store offset data bits. The bits stored in register 216 are provided to register 216 by an offset portion 408 of pipeline processor register 402. The number of bits stored in register 216 is $B_6$. In one embodiment, $B_6$ is the upper eleven bits of a sixteen bit memory offset. In other embodiments, more than or less than eleven bits may be stored.

Register 218 is used to store a carry bit. The carry bit stored in register 218 is generated by adder 226.

As shown in FIG. 4, data bits are read into registers 212, 414, 216, and 218 whenever an array update signal is applied to these registers. This array update signal is generated by control logic 234. Data is cleared from registers 212, 414, 216, and 218 (or marked as invalid) whenever an array invalidate signal is applied to these registers. This array invalidate signal is generated by control logic 236.

Comparator 414 of micro tag array 410 is coupled to register 412 and base register portion 404 of processor pipeline register 402. Comparator 414 compares bits stored in base register portion 404 of processor pipeline register 402 to bits stored in register 412. If the two sets of bits match, comparator 414 generates a hit signal. Otherwise, comparator 414 generates a miss signal. The output signal of comparator 414 is provided to control logic 228.

Comparator 222 of micro tag array 410 is coupled to register 216 and offset portion 408 of processor pipeline register 402. Comparator 222 compares bits stored in offset portion 408 of processor pipeline register 402 to bits stored in register 216. If the two sets of bits match, comparator 222 generates a hit signal. Otherwise, comparator 222 generates a miss signal. The output signal of comparator 222 is provided to control logic 228.

Comparator 224 of micro tag array 410 is coupled to register 218 and adder 226. Comparator 224 compares the carry bit stored in register 218 to a carry bit generated by adder 226. If the two carry bits match, comparator 224 generates a hit signal. Otherwise, comparator 224 generates a miss signal. The output signal of comparator 224 is provided to control logic 228.

Adder 226 adds bits $B_9$, stored in base address portion 406 of processor pipeline register 402 to bits $B_7$ stored in offset portion 408 of processor pipeline register 402 and generates a carry bit. This carry bit is provided to comparator 224. The carry bit is also stored in register 218. In one embodiment, adder 226 adds the lower five bits of a memory base address stored in base address portion 406 of processor pipeline register 402 to the lower five bits of a memory offset stored in offset portion 408 of processor pipeline register 402. In other embodiments, more than or less than five bits may be added by adder 226.

Control logic 228 generates a micro tag array entry hit signal if each of the comparators 414, 222, and 224 generate a hit signal. Otherwise, control logic 228 generates a miss signal. The output signal of control logic 228 is provided to control logic 230 and control logic 232.

Control logic 230 is used to generate a dataram enable signal. The inputs to control logic 230 are the output signal of control logic 228, a LOAD/STORE ACCESS signal, and the way selection data bits stored in register 212.

Control logic 232 is used to generate a tagram enable signal. The inputs to control logic 232 are the output signal of control logic 228 and a LOAD/STORE ACCESS signal.

Figure 5:
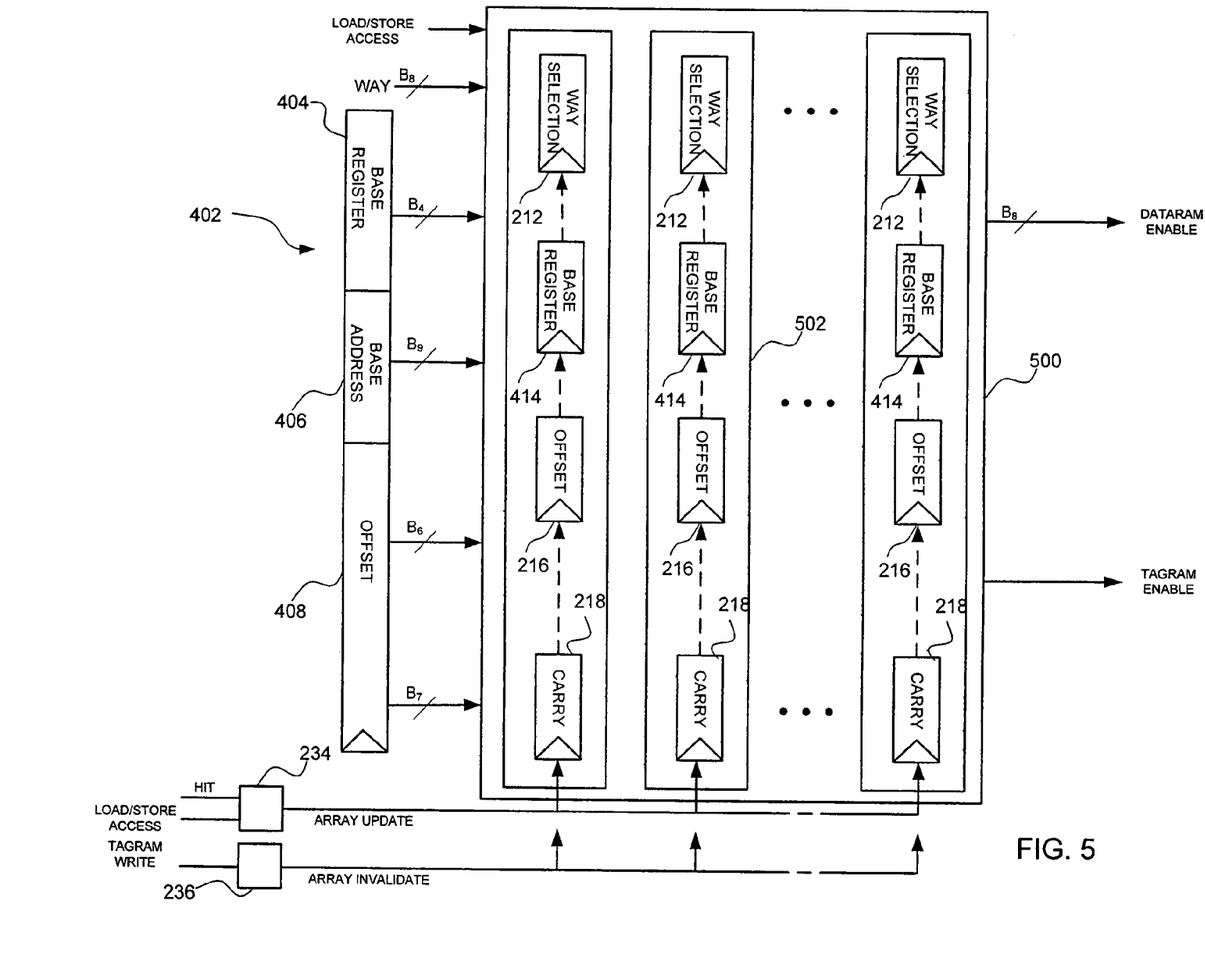
FIG. 5 is a diagram of a processor having a micro tag array according to a fourth embodiment of the present invention.

FIG. 5 is a diagram of a processor having a micro tag array 500 according to an embodiment of the present invention. Micro tag array 500 includes a plurality of array entries 502. In preferred embodiments of the present invention, micro tag array 500 includes from one to four array entries 502. The invention is not limited, however, to having between one and four array entries. Micro tag array 500 is a multi-entry micro tag array that operates in a manner similar to micro tag array 410.

As can be seen, for example, from a comparison of FIGS. 2 and 4, the base address comparison implemented by register 214 and comparator 220 of the processor of FIG. 2 is replaced by a base register comparison in the processor of FIG. 4. This base register comparison is implemented using register 412 and comparator 414. This feature of the processor of FIG. 4 avoids the need for a wide base address comparison and offers more timing flexibility for high speed processors.

The processors of FIGS. 4 and 5 operate in a manner similar to that described herein with regard to the processors of FIGS. 2 and 3. Thus, it is not necessary to repeat this description here. Please see the description herein relating to how processors of the present invention operate to reduce data cache access power.

Figure 6:
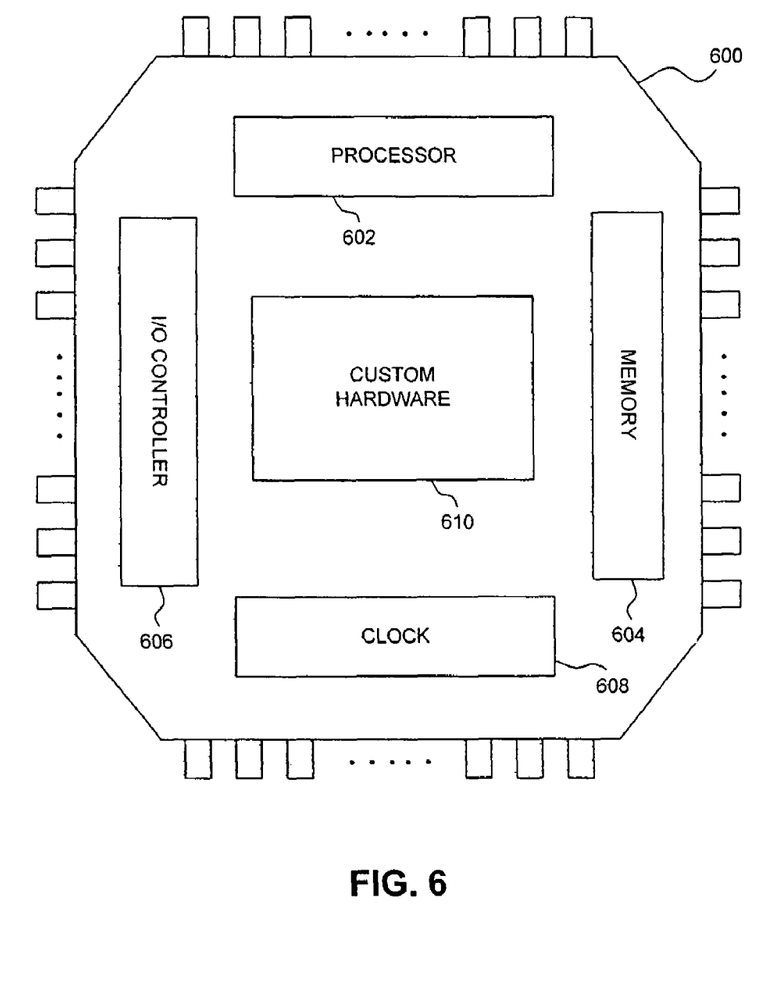
FIG. 6 is a diagram of an example system embodiment of the present invention.

FIG. 6 is a diagram of an example system 600 according to an embodiment of the present invention. System 600 includes a processor 602, a memory 604, an input/output (I/O) controller 606, a clock 608, and custom hardware 610. In an embodiment, system 600 is an application specific integrated circuit (ASIC) or a system on a chip (SOC).

Processor 602 is any processor that includes features of the present invention described herein and/or implements a method embodiment of the present invention. In one embodiment, processor 602 includes an instruction fetch unit, an instruction cache, an instruction decode and dispatch unit, one or more instruction execution unit(s), a data cache, a register file, and a bus interface unit similar to processor 100 described above.

Memory 604 can be any memory capable of storing instructions and/or data. Memory 604 can include, for example, random access memory and/or read-only memory.

Input/output (I/O) controller 606 is used to enable components of system 600 to receive and/or send information to peripheral devices. I/O controller 606 can include, for example, an analog-to-digital converter and/or a digital-to-analog converter.

Clock 608 is used to determine when sequential subsystems of system 600 change state. For example, each time a clock signal of clock 608 ticks, state registers of system 600 capture signals generated by combinatorial logic. In an embodiment, the clock signal of clock 608 can be varied. The clock signal can also be divided, for example, before it is provided to selected components of system 600.

Custom hardware 610 is any hardware added to system 600 to tailor system 600 to a specific application. Custom hardware 610 can include, for example, hardware needed to decode audio and/or video signals, accelerate graphics operations, and/or implement a smart sensor. Persons skilled in the relevant arts will understand how to implement custom hardware 610 to tailor system 600 to a specific application.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. A processor that implements load and store instructions, comprising:
    a cache that includes a plurality of datarams;
    a processor pipeline register that stores base address data bits and offset data bits; and
    a micro tag array, coupled to the cache and the processor pipeline register, wherein the micro tag array comprises:
        a base register configured to store base address data bits,
        an offset register configured to store offset data bits,
        a carry bit register configured to store a first carry bit, and
        a way selection register configured to store way selection data bits and wherein the micro tag array is configured to invalidate, upon a tagram write, an array entry whose way selection data bits correspond to an intended refill way of the cache, and
    if first selected base address data bits stored in the processor pipeline register match base address data bits stored in the base register of the micro tag array, and
    if first selected offset data bits stored in the processor pipeline register match offset data bits stored in the offset register of the micro tag array, and
    if a second carry bit formed by an addition of second selected base address data bits stored in the processor pipeline register and second selected offset data bits stored in the processor pipeline register match the first carry,
    the micro tag array outputs an enable signal that enables a first dataram of the cache specified by way selection data bits stored in the way selection register of the micro tag array.

2. The processor of claim 1, wherein the first selected base address data bits consist of a subset of the base address data bits stored in the processor pipeline register.

3. The processor of claim 1, wherein the first selected offset data bits consist of a subset of the offset data bits stored in the processor pipeline register.

4. The processor of claim 1, wherein the second selected base address data bits consist of a subset of the base address data bits stored in the processor pipeline register, and the second selected offset data bits consist of a subset of the offset data bits stored in the processor pipeline register.

5. The processor of claim 1, wherein the micro tag array outputs an enable signal that enables a tagram of the cache if the first selected offset data bits stored in the processor pipeline register match offset data bits stored in the micro tag array.

6. The processor of claim 1, wherein the micro tag array includes a plurality of array entries, each array entry storing base address data bits, offset data bits, a carry bit, and way selection data bits.

7. The processor of claim 6, wherein data stored in the micro tag array is replaced according to a least-recently-filled replacement scheme.

8. A processor that implements load and store instructions, comprising:
    a cache that includes a plurality of datarams;
    a processor pipeline register that stores base register data bits, base address data bits, and offset data bits; and
    a micro tag array, coupled to the cache and the processor pipeline register, wherein the micro tag array comprises:
        a base register configured to store base address data bits,
        an offset register configured to store offset data bits,
        a carry register configured to store a first carry bit,
        a way selection register configured to store way selection data bits and wherein the micro tag array is configured to invalidate, upon a tagram write, an array entry whose way selection data bits correspond to an intended refill way of the cache, and
    if first selected base register data bits stored in the processor pipeline register match base register data bits stored in the base register of the micro tag array, and
    if first selected offset data bits stored in the processor pipeline register match offset data bits stored in the offset register of the micro tag array, and
    if a second carry bit formed by an addition of first selected base address data bits stored in the processor pipeline register and second selected offset data bits stored in the processor pipeline register match the first carry bit, the micro tag array outputs an enable signal that enables a first dataram of the cache specified by way selection data bits stored in the way selection register of the micro tag array.

9. The processor of claim 8, wherein the first selected offset data bits consist of a subset of the offset data bits stored in the processor pipeline register.

10. The processor of claim 8, wherein the second selected offset data bits consist of a subset of the offset data bits stored in the processor pipeline register.

11. The processor of claim 8, wherein the micro tag array outputs an enable signal that enables a tagram of the cache if the first selected offset data bits stored in the processor pipeline register match offset data bits stored in the micro tag array.

12. The processor of claim 8, wherein the micro tag array includes a plurality of array entries, each array entry storing base address data bits, offset data bits, a carry bit, and way selection data bits.

13. The processor of claim 12, wherein data stored in the micro tag array is replaced according to a least-recently-filled replacement scheme.

14. A system, comprising:
a cache that includes a plurality of datarams;
a processor pipeline register that stores first data bits and second data bits; and
a micro tag array, coupled to the cache and the processor pipeline register, wherein the micro tag array comprises:
a first register configured to store first data bits,
a second register configured to store second data bits,
a carry register configured to store a first carry bit,
a way selection register configured to store way selection data bits and wherein the micro tag array is configured to invalidate, upon a tagram write, an array entry whose way selection data bits correspond to an intended refill way of the cache, and
if selected first data bits stored in the processor pipeline register match a first set of data bits stored in the first register of the micro tag array, and
if selected second data bits stored in the processor pipeline register match a second set of data bits stored in the second register of the micro tag array, and
if a second carry bit formed by an addition of a first subset of data bits stored in the processor pipeline register and a second subset of data bits stored in the processor pipeline register match the first carry bit,
the micro tag array outputs an enable signal that enables a first dataram of the cache specified by way selection data bits stored in the way selection register of the micro tag array.

15. The system of claim 14, wherein the first data bits are base address data bits, and the second data bits are offset data bits.

16. The system of claim 14, wherein the first data bits are base register data bits, and the second data bits are offset data bits.

17. The system of claim 14, wherein the micro tag array includes a plurality of array entries, each array entry storing base address data bits, offset data bits, a carry bit, and way selection data bits.

18. The system of claim 17, wherein data stored in the micro tag array is replaced according to a least-recently-filled replacement scheme.

19. A computer usable medium comprising a processor embodied in software, the processor comprising:
a cache that includes a plurality of datarams;
a processor pipeline register that stores first data bits and second data bits; and
a micro tag array, coupled to the cache and the processor pipeline register, wherein the micro tag array comprises:
a first register configured to store first data bits,
a second register configured to store second data bits,
a carry register configured to store a first carry bit,
a way selection register configured to store way selection data bits and wherein the micro tag array is configured to invalidate, upon a tagram write, an array entry whose way selection data bits correspond to an intended refill way of the cache, and
if selected first data bits stored in the processor pipeline register match a first set of data bits stored in the first register of the micro tag array, and
if selected second data bits stored in the processor pipeline register match a second set of data bits stored in the second register of the micro tag array, and
if a second carry bit formed by an addition of a first subset of data bits stored in the processor pipeline register and a second subset of data bits stored in the processor pipeline register match the first carry bit,
the micro tag array outputs an enable signal that enables a first dataram of the cache specified by way selection data bits stored in the way selection register of the micro tag array.

20. The computer usable medium of claim 19, wherein the first data bits are base address data bits, and the second data bits are offset data bits.

21. The computer usable medium of claim 19, wherein the first data bits are base register data bits, and the second data bits are offset data bits.

22. The computer usable medium of claim 19, wherein the micro tag array includes a plurality of array entries, each array entry storing base address data bits, offset data bits, a carry bit, and way selection data bits.

23. The computer usable medium of claim 22, wherein data stored in the micro tag array is replaced according to a last-recent-filled replacement scheme.

24. The computer usable medium of claim 19, wherein the processor is embodied in hardware description language software.

25. The computer usable medium of claim 24, wherein the processor is embodied in one of Verilog hardware description language software and VHDL hardware description language software.

* * * * *